United States Patent [19]

Guidot et al.

[11] 4,306,588
[45] Dec. 22, 1981

[54] PNEUMATIC CONTROL APPARATUS FOR BI-MANUAL SECURITY

[75] Inventors: Claude Guidot, Saint-Peray; Pierre Le Torrivellec, Chabeuil, both of France

[73] Assignee: Crouzet, Paris, France

[21] Appl. No.: 191,759

[22] Filed: Sep. 29, 1980

[30] Foreign Application Priority Data

Oct. 5, 1979 [FR] France ................................. 79 25026

[51] Int. Cl.³ .............................................. F16P 3/22
[52] U.S. Cl. .................................. 137/625.6; 91/424; 251/28
[58] Field of Search ....................... 91/424; 137/625.6; 192/131 R, 131 H; 251/12, 26, 28

[56] References Cited

U.S. PATENT DOCUMENTS

| | | | |
|---|---|---|---|
| 3,047,017 | 7/1962 | Brinkel | 91/424 X |
| 3,605,554 | 9/1971 | Philbrick | 192/131 R X |
| 4,063,627 | 12/1977 | Wright | 192/131 R |

Primary Examiner—Robert G. Nilson
Attorney, Agent, or Firm—Holman & Stern

[57] ABSTRACT

The invention relates to a security pneumatic control apparatus comprising an OR cell, an AND cell, a capacitor, connected to the OR cell by means of a debit regulator, and a priority cell connected to the capacitor and to the AND cell. The AND cell comprises a valve member, for engaging two seats, and a diaphragm, for moving the valve member onto one of the two seats. The cross-sections of the diaphragm and of the last mentioned seat of the AND cell are $S'_3$ and $S'_2$ respectively. The priority cell comprises a valve member, for engaging two seats, and a diaphragm, for moving the valve member onto one of the two seats. The cross-sections of the diaphragm and of the last mentioned seat of the prioritary cell are $S_3$ and $S_1$ respectively. In the invention, $$S'_3/S'_2 < S_3/S_1.$$

When the supply pressures at the OR cell and AND cell are not equal, the security remains guaranteed for the control of dangerous machines.

3 Claims, 2 Drawing Figures

PNEUMATIC CONTROL APPARATUS FOR BI-MANUAL SECURITY

BACKGROUND OF THE INVENTION

This invention relates to a pneumatic control apparatus for bi-manual security of the type comprising an OR cell, connected, at the input side, to two supply conduit lines, and, at the output side, to a capacitor, through a debit regulator, and AND cell, connected, at the input side, to the two supply conduit lines, a so-called prioritary cell, comprising a valve member, arranged for engaging a first seat, under the action of the pressure inside the capacitor, and a second seat, under the action of the output pressure of the AND cell in an input conduit of the prioritary cell, an output conduit which can communicate with the input conduit through the first seat, the prioritary cell being arranged so that the communication between its input and output conduits remains cut off after the pressure appears again in one of the two supply conduits in which the pressure dropped before.

Such a pneumatic control apparatus for bi-manual security is described, for instance, in French Pat. No. 72 16898. The object of this apparatus is to improve the security in connection with the control of machines which are dangerous for the hands of operators, such as presses.

Nevertheless, such an apparatus has the drawback that the bi-manual security is not guaranteed anylonger, when the two supply pressures are not equal.

SUMMARY OF THE INVENTION

It is an object of this invention to overcome this drawback.

Thus, the invention relates to an apparatus of the above mentioned type, characterized in that the AND cell comprises a valve member arranged for engaging a seat, diaphragm, upon which the pressure in one of the two supply conduits is acting, for engaging one of the faces of the valve member and moving the latter onto its seat, the pressure in the other supply conduit possibly acting upon the other face of the valve member, the cross-section $S_1$ of the first seat and the surface $S_3$ of the valve member of the prioritary cell, upon which the pressure in the capacitor is acting, on the one hand, and the cross-section $S'_3$ of the diaphragm and the cross-section $S'_2$ of the seat of the AND cell, on the other hand, being related through the relation $$S'_3/S'_2 < S_3/S_1.$$

DESCRIPTION OF THE PREFERRED EMBODIMENT

Figure 1:
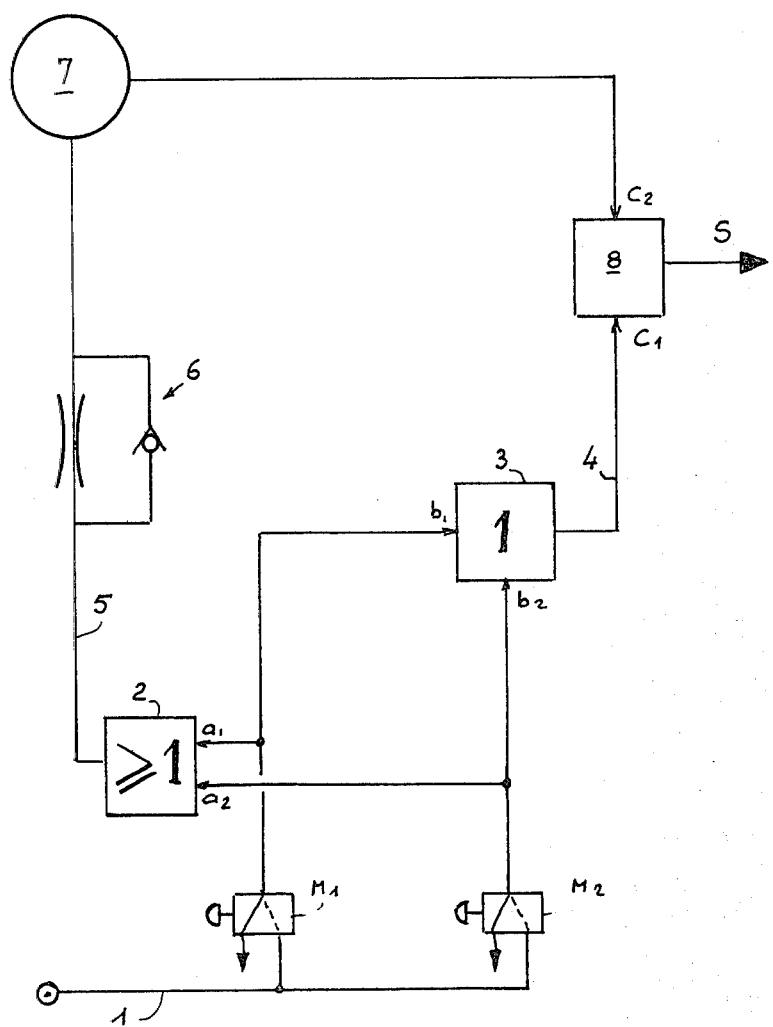
FIG. 1 is a schematic view of the instant pneumatic control apparatus.

Referring to FIG. 1, the instant pneumatic control apparatus comprises first two manual controls $M_1$ and $M_2$, connected to a supply network 1. It further comprises an OR cell 2, connected, at the input side, to two supply conduits $a_1, a_2$, and AND cell 3, connected, at the input side, to two supply conduits $b_1, b_2$, the supply conduits $a_1, b_1$ and $a_2, b_2$ being connected to the output conduits of the two manual controls $M_1$ and $M_2$, respectively, a capacitor 7, connected, at the input side, to the output 5 of the OR cell 2, through a debit regulator 6, and a so-called prioritary cell 8, connected, at the input $C_2$, to the output of the capacitor 7, and, at the input $C_1$, to the output 4 of the AND cell 3, and having an output S.

The prioritary cell 8 is arranged so that only its input $C_1$ can communicate with its output S, and this, only if the control signal at $C_1$ is present before the control signal at $C_2$. If this condition is not complied with, the communication between the input $C_1$ and the output S is cut off, and no signal can go through output S, which is then connected to an exhaust conduit.

Figure 2:
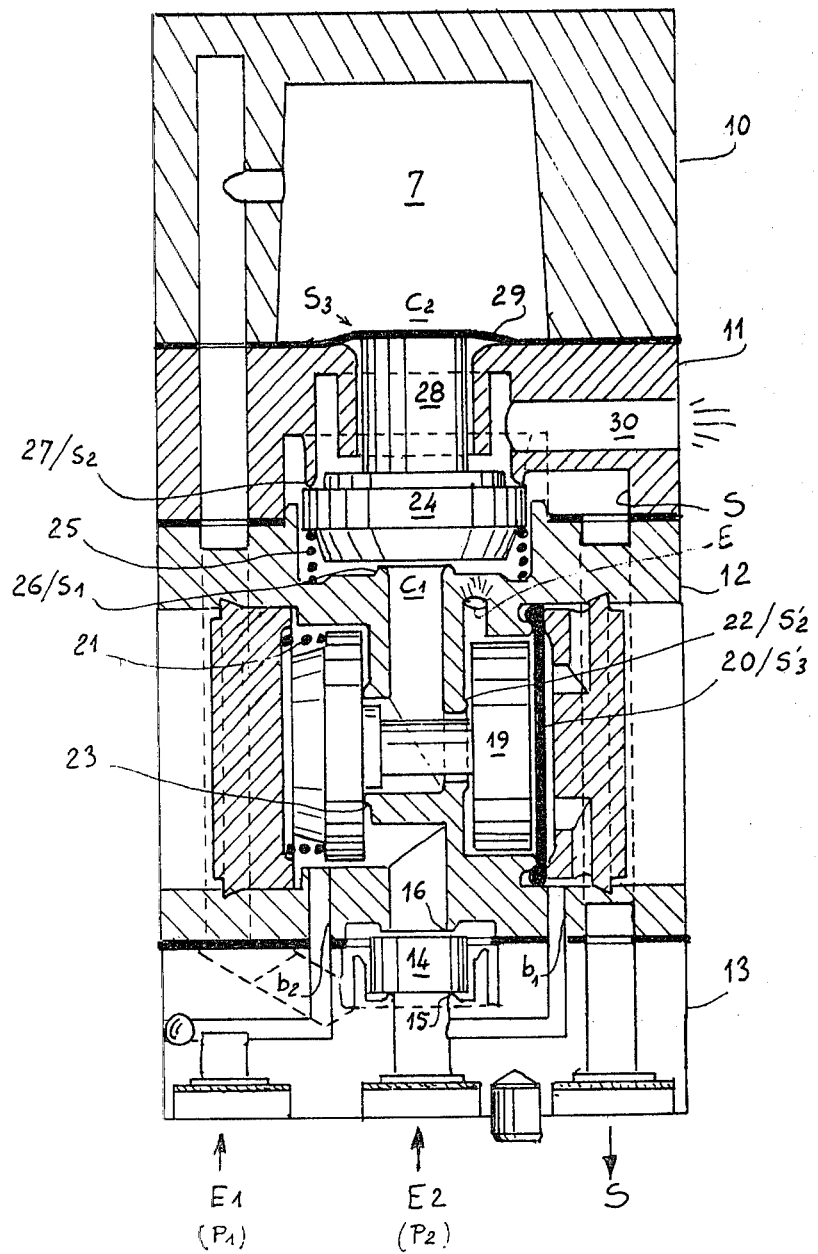
FIG. 2 is a sectional view of the instant pneumatic control apparatus.

The structure in practice of the instant apparatus referring to FIG. 2, will now be described. It comprises several elements 10, 11, 12 and 13 in a pile arrangement and connected to each other by means of conduit lines, according to the drawing of FIG. 1.

A first element 13 is used as a connecting baseplate and comprises two inputs $E_1$ and $E_2$, corresponding to the outputs of the two manual controls of FIG. 1, as well as an output S, corresponding to the output S of the prioritary cell 8 of FIG. 1, as hereinafter described.

Element 13 is connected to element 12, and around their common plane is provided a valve member 14, in element 13, a seat 15, in element 13, and a seat 16, in element 12, seats 15 and 16 having an identical cross-section. Valve member 14 and seats 15, 16 constitute the OR cell 2 of FIG. 1. The valve member 14 is slidingly mounted between the two seats 15 and 16, and is acted upon, at the seat 15 side, by the supply pressure at the input $E_2$, and, at the seat 16 side, by the supply pressure at the input $E_1$, through conduit lines provided in elements 13 and 12, one of which being one of the input conduits $b_2$ of the AND cell 3, hereinafter described.

Within element 12 is provided a double valve member 19, acted upon, at one side, by a spring 21 and eventually by the supply pressure at input $E_1$, and, at the other side, by the supply pressure at the input $E_2$, by means of conduit lines provided in elements 13 and 12, one of which being conduit $b_1$ of FIG. 1, and of a piloting diaphragm 20. This double valve member 19 is slidingly mounted on both sides of two seats 22 and 23, arranged for engaging its opposite internal walls. Spring 21 and pressure at $E_1$ tend to move valve member 19 onto its seat 23, and diaphragm 20 is arranged for engaging one of the faces of valve member 19 and moving it onto seat 22. Valve member 19 and seats 22, 23 constitute the AND cell 3 of FIG. 1. This AND cell comprises an exhaust conduit E and an output conduit $C_1$ corresponding to the input conduit of the prioritary cell which will now be described.

This prioritary cell is disposed at the common plane of elements 12 and 11. It comprises a simple valve member 24, extended by piston means 28, valve member 24 being slidingly mounted between a seat 26, in element 12, and a seat 27, in element 11. Valve member 24 is acted upon, at one side, by a spring 25 and by the pressure in conduit $C_1$, which tend to move it onto seat 27, and, at the other side, by pressure $C_2$ acting upon a driving diaphragm 29, disposed at the common plane of elements 11 and 10, engaging piston means 28 and tending to move, through the piston 28, valve member 24 onto seat 26.

The above mentioned output S can communicate with input $C_1$ of the prioritary cell through seat 26 and conduit lines provided in elements 11, 12 and 13. An exhaust conduit 30 is provided in element 11 and can communicate with output S through seat 27.

Element 10 comprises a recess 7, which is the capacitor of FIG. 1, communicating with the volume provided between seats 15 and 16 of the OR cell, through conduit lines provided in elements 13,12,11 and 10. Pressure $C_2$ in capacitor 7 acts upon diaphragm 29, which in turn engages piston means 28 of valve member 24.

Seats 26,27 and diaphragm 29 have effective cross-sections $S_1$, $S_2$ and $S_3$, respectively, which are related through the relation $$S_1 < S_3 < S_2 \qquad (2).$$

Seat 22 and diaphragm 20 have effective cross-sections $S'_2$ and $S'_3$, respectively.

The preceding greatnesses are related through the relation $$S'_3/S'_2 < S_3/S_1 \qquad (2).$$

The above described apparatus operates in the following manner.

If the signals provided by the manual controls $M_1$ and $M_2$ reach simultaneously inputs $E_1$ and $E_2$, the OR cell (14,15,16) lets a signal go to the input of capacitor 7 and, simultaneously, the AND cell (19,22,23) lets a signal go to its output $C_1$, that is to the input $C_1$ of the prioritary cell (24,26,27).

No pressure being yet inside capacitor 7, valve member moves onto seat 27.

As a matter of fact, the valve member being acted upon by spring 25, it already engages this seat, and thus, it does not move. This spring is therefore not necessary. Signal going through conduit $C_1$ reaches directly output S.

When the pressure has increased inside capacitor 7, valve member 24 remains onto seat 27 and the signal is maintained at output S, since $S_3$ is smaller than $S_2$.

If one of the two controls $M_1$ and $M_2$ is released, the signal at the output $C_1$ of the AND cell disappears, whereas pressure $C_2$ in capacitor 7, at the output of the OR cell, is maintained.

Valve member 24, through diaphragm 29 and piston means 28, moves onto seat 26, this cutting of the communication between the input $C_1$ and the output S of the prioritary cell, which is connected to exhaust port 30, through seat 27.

When the manual control which had been released is again actuated, a signal appears again at $C_1$, but $S_3$ being smaller than $S_1$, valve member 24 does not move.

Only if both manual controls $M_1$ and $M_2$ are released, this leading to the signals at seat 26 and diaphragm 29 disappearing, and are then actuated again simultaneously, a signal at the output S can be obtained. To this respect, the volume of capacitor 7 is determined so that theactuations of manual controls $M_1$ and $M_2$ by a normal operator are considered as simultaneous.

In relation with the above described operating steps, it has been assumed that both supply pressures at $E_1$ and $E_2$ were equal. But this might not be the case, for reason, for instance, of clogging or of leakage in one of the manual controls.

Nevertheless, the security is guaranteed and no control signal can appear at the output.

Indeed, once there is a residual pressure $P_2$ for instance at the input $E_2$, and if the pressure $P_1$ at input $E_1$ is at first zero, valve member 14 moves onto seat 16. Pressure $P_2$ is transmitted to capacitor 7.

Valve member 24 moves onto seat 26. Communication between $C_1$ and S is cut off. Pressure $P_2$ is also transmitted to diaphragm 20.

Valve member 19 moves onto seat 22 and away from seat 23. When the operator actuates controls $M_1$, pressure $P_1$ is established at input $E_1$, with the relation $$P_1 > P_2.$$

Valve member 19 being away from seat 23, pressure $P_1$ reaches $C_1$. But the communication between $C_1$ and S remains cut off, and $C_1$ is then connected to exhaust port E, because of the fact that valve member 19 moves away from seat 22 to move onto seat 23.

Indeed, relation (2) can be put otherwise, and as following $$S'_3/S'_2 < P_1/P_2 \qquad (3)$$

$$S_3/S_1 > P_1/P_2 \qquad (4)$$

or $$P_2 S'_3 < P_1 S'_2 \qquad (5)$$

$$P_2 S_3 > P_1 S_1 \qquad (6)$$

Relation (5) means that valve member 19 moves away from seat 22 to connect $C_1$ with the exhaust port. Relation (6) means that valve member 24 keeps engaging seat 26 to maintain communication between $C_1$ and S cut off. As regard to relation (6), it has to be noted that from the moment when pressure P, is established at input $E_1$, this pressure $P_1$ is established in capacitor 7 with some delay, because of the debit regulator 6, not shown in FIG. 2, and that it is relation (6), with pressure $P_2$ in capacitor 7, which has to be considered in order that the prioritary cell (24,26,27) remains in the same state.

To the contrary, with a residual pressure $P_1$ at the input $E_1$, with $P_2$ equal to zero, valve member 24, because of the pressure $P_1$ in capacitor 7, moves onto seat 26, communication between $C_1$ and S being cut off. When pressure $P_2$, in this case greater than $P_1$, is established at the input $E_2$, valve member 14 moves from one seat to the other, as valve member 19 also does and closes seat 22, and pressure $P_2$ establishes in capacitor 7, without any action on valve member 24 of the prioritary cell, which already engages seat 26, because of relation (6).

While there is in this application specifically described one form which the invention may assume in practice, it will be understood that this form of the same is shown for purposes of illustration only and that the invention may be modified and embodied in various other forms without departing from its spirit or the scope of the appended claims.

The invention claimed is:

1. A pneumatic control apparatus for bi-manual security of the type comprising an OR cell, connected, at the input side, to two supply conduit lines, and, at the output side, to a capacitor, through a debit regulator, and AND cell, connected, at the input side, to the two supply conduit lines, a so-called prioritary cell, comprising a valve member, arranged for engaging a first seat, under the action of the pressure inside the capacitor, and a second seat, under the action of the output pressure of the AND cell in an input conduit of the prioritary cell, an output conduit which can communicate with the input conduit through the first seat, the prioritary cell being arranged so that the communication between its input and output conduits remains cut off after the pressure appears again in one of the two supply conduits in which the pressure dropped before, characterized in that the AND cell comprises a valve member arranged for engaging a seat, a diaphragm, upon which the pressure in one of the two supply conduits is acting, for engaging one of the faces of the valve member and moving the latter onto its seat, the pressure in the other supply conduit possibly acting upon the other face of the valve member, the cross-section $S_1$ of the first seat and the surface $S_3$ of the valve member of the prioritary cell, upon which the pressure in the capacitor is acting, on the one hand, and the cross-section $S'_3$ of the diaphragm and the cross-section $S'_2$ of the seat of the AND cell, on the other hand, being related through the relation $$S'_3/S'_2 \text{''} S_3/S_1.$$

2. Apparatus as defined in claim 1, wherein said prioritary cell comprises an exhaust conduit which can communicate with said output conduit, through said second seat.

3. Apparatus as defined in one of claims 1 or 2, wherein the pressure in said capacitor is acting upon said valve member of said prioritary cell through a piloting diaphragm and piston means.

* * * * *